United States Patent [19]

Davies et al.

[11] Patent Number: 4,587,290
[45] Date of Patent: May 6, 1986

[54] POLYMERIZATION PROCESS USING NONIONIC SURFACTANT AND COPOLYMERIZABLE UNSATURATED POLYETHYLENE GLYCOL

[75] Inventors: Stephen P. Davies, Melbourne, Australia; Morice W. Thompson, Maidenhead, England

[73] Assignee: Imperial Chemical Industries PLC, London, England

[21] Appl. No.: 533,816

[22] Filed: Sep. 19, 1983

[30] Foreign Application Priority Data

Oct. 1, 1982 [GB] United Kingdom ................ 8228046
Oct. 1, 1982 [GB] United Kingdom ................ 8228151

[51] Int. Cl.[4] .......................... C08L 31/00; C08F 2/00
[52] U.S. Cl. .................................... 524/558; 526/229
[58] Field of Search .............................. 526/229, 201

[56] References Cited

U.S. PATENT DOCUMENTS

| 2,333,635 | 11/1943 | Britton et al. | 526/229 |
| 3,255,127 | 6/1966 | von Bonin et al. | 526/201 |
| 3,281,377 | 10/1966 | Lederer et al. | 526/201 |
| 3,382,297 | 5/1968 | Thompson | 526/201 |
| 3,960,935 | 6/1976 | Samour | 526/229 |

FOREIGN PATENT DOCUMENTS

| WO83/00151 | 1/1983 | PCT Int'l Appl. |
| 1196247 | 6/1970 | United Kingdom . |
| 1544335 | 4/1979 | United Kingdom . |
| 1553722 | 10/1979 | United Kingdom . |

Primary Examiner—Joseph L. Schofer
Assistant Examiner—Peter F. Kulkosky
Attorney, Agent, or Firm—Cushman, Darby & Cushman

[57] ABSTRACT

Wholly non-charged, sterically stabilized aqueous polymer dispersions are made by emulsifying ethylenically unsaturated monomer(s) of specified slight solubility in water and subjecting them in that state to polymerization in the presence of hydrogen peroxide and a nonionic water-soluble activator compound and also in the presence of a steric stabilizer precursor compound containing a polymer chain which is soluble in the aqueous phase and an unsaturated grouping which can copolymerize with the monomer(s). The emulsification may be assisted by a conventional non-ionic surfactant, or alternatively the precursor compound may itself possess surface-active properties.

12 Claims, No Drawings

POLYMERIZATION PROCESS USING NONIONIC SURFACTANT AND COPOLYMERIZABLE UNSATURATED POLYETHYLENE GLYCOL

This invention relates to the preparation of stable dispersions or latices in aqueous media of polymers derived from ethylenically unsaturated monomers, more particularly to a process of preparing such dispersions which avoids the use of ionisable species as polymerisation initiator, as emulsifier for the monomer or as stabiliser for the polymer disperse phase, and which results in the production of a dispersion in which the stabilisation of the disperse phase is wholly steric in character. A special feature of the process is the use of a redox polymerisation initiator system based on hydrogen peroxide, from which a number of advantages follow including the accessibility of aqueous dispersions of certain polymers which cannot otherwise readily be produced.

The so-called aqueous emulsion polymerisation of ethylenically unsaturated monomers is a very well known process. It is somewhat misleadingly named inasmuch as, although the bulk of the monomer which is to be polymerised exists initially as droplets emulsified in the aqueous medium employed, the actual polymerisation initially takes place not within those droplets but within the aqueous medium, in which a significant concentration of dissolved monomer is maintained throughout the process, and subsequently within the polymer particles forming therein. For this reason, the technique is not applicable to monomers which have a negligible solubility in water. Arising from this, the process calls for the presence, firstly, of a surfactant dissolved in the aqueous medium whereby the emulsified droplets of monomer are stabilised whilst in effect constituting a reservoir from which monomer in solution in the aqueous medium is replenished as polymerisation proceeds; secondly, it requires the presence of a free-radical type polymerisation initiator which is soluble in the aqueous medium, in order to bring about polymerisation of the dissolved monomer rather than of the emulsified material. It has become customary to use ionisable compounds for both of these functions. Thus there are commonly used as surfactants such anionic substances as sodium dodecylbenzenesulphonate, sodium dioctylsulphosuccinate and the alkali metal or ammonium salts of sulphonated fatty alcohols, and as polymerisation initiators water-soluble per-compounds, such as ammonium persulphate or potassium persulphate. In the resulting dispersions, the polymer particles of the disperse phase are stabilised against gross flocculation or aggregation by the presence on their surfaces of electrically charged species derived from these ionisable surfactants and/or initiators. This stability of the disperse phase is, however, rather readily disturbed by certain external influences to which the dispersions may be subjected, in particular by shear forces, by the introduction of polyvalent ions, by freeze-thaw conditions or by pH changes.

It has already been proposed, in British Patent Specification No. 1,196,247, to prepare aqueous dispersions of synthetic polymers in which the polymer particles are stabilised against gross flocculation by a different, steric mechanism, namely by means of the presence in the dispersion of an amphipathic polymeric stabiliser which has the ability to form around each particle a protective barrier of polymer chains which are solvated by the aqueous medium. By this procedure, the presence on the polymer particles of charged species derived from a conventional ionic surfactant is avoided, but no emphasis is placed in the above-mentioned specification upon the desirability of avoiding the use of ionic initiators and indeed the use of such materials as ammonium persulphate or potassium persulphate is proposed.

There has also previously been described, in British Patent Specification No. 1,544,335, a process for polymerising an ethylenically unsaturated monomer in water in the presence of a catalyst and also in the presence of a block copolymer dispersion stabiliser which contains at least two polymeric blocks of which one is hydrophilic and the other is hydrophobic, the hydrophilic blocks serving to provide a stabilising barrier around the polymer particles. Here again the introduction of charged species by the use of a conventional surfactant is avoided, but there is no reference to the desirability of using non-ionic initiators and the initiators described as being suitable include a number of the ionic type.

In our British Application Nos. 8214675 and 8312212 we describe an emulsion polymerisation process for making wholly non-charged, sterically stabilised aqueous dispersions or latices of synthetic addition polymers in which there are used water-soluble, monomer-insoluble non-ionisable azo polymerisation initiators. We have now found that there are advantages in replacing the azo initiator in such a process by a redox-type polymerisation initiator system comprising hydrogen peroxide in combination with a non-ionic water-soluble activator compound.

According to the present invention there is provided a polymerisation process in which at least one ethylenically unsaturated monomer, having a solubility in water in the range 0.08%–8% by weight but giving rise to a polymer which is insoluble in water, is emulsified in water and is subjected in that state to polymerisation in the presence of (a) a redox-type polymerisation initiator system comprising hydrogen peroxide in combination with a non-ionic water-soluble activator compound and (b) a precursor compound containing in the molecule (i) a polymer chain which has a molecular weight of at least 400, preferably at least 1000, and is per se soluble in the aqueous phase, and (ii) an unsaturated grouping which is copolymerisable with the monomer or monomers being polymerised.

Ethylenically unsaturated monomers which may be polymerised by the process of the invention include, for example, acrylic monomers such as methyl methacrylate, ethyl methacrylate, butyl methacrylate, methoxypropyl methacrylate, cyclohexyl methacrylate, benzyl methacrylate, hydroxyethyl acrylate, hydroxyethyl methacrylate, hydroxyisopropyl methacrylate, benzyl acrylate, dimethylaminoethyl methacrylate, ethyl acrylate, butyl acrylate, hydroxybutyl acrylate, N-butoxymethyl methacrylamide, N-butoxymethyl acrylamide, acrylonitrile, acrylic acid and methacrylic acid, maleic anhydride, itaconic anhydride, vinyl monomers such as vinyl acetate, vinyl propionate, styrene, vinyl toluene, tert-butylstyrene, methoxystyrene and vinyl pyridine, and halogenated vinyl monomers such as vinyl chloride and vinylidene chloride. All these monomers exhibit the required minimum solubility in water. There may, if desired, be used together with one or more of such monomers a minor proportion of a monomer having an insignificant solubility in water, for example 2-ethylhexyl acrylate or stearyl methacrylate, which would not be polymerisable on its own by the aqueous emulsion procedure. As explained in more detail below, the process has the particular advantage of facilitating the polymerisation of monomer mixtures containing significant proportions of water-sensitive monomers such as glycidyl acrylate, glycidyl methacrylate or γ-methacryloxypropyltrimethoxysilane.

The monomers to be polymerised may also include monomers which are polyfunctional with respect to the polymerisation reaction, whereby the particles in the resulting aqueous dispersion will consist of crosslinked polymer. Suitable polyfunctional monomers include, for example, allyl methacrylate, ethylene glycol dimethacrylate, hexanediol diacrylate, trimethylolpropane triacrylate and divinylbenzene.

Although the process of the invention may be performed satisfactorily with any of the monomers listed above, or any combination of them, we have found that the resulting latices are of finer particle size when the polymer or copolymer obtained has a relatively low environmental glass transition temperature (Tg). Thus it is preferred that the polymer or copolymer should have a Tg of not more than 60° C., but the invention is not limited to the production of dispersions of such polymers. Dispersions of polymer of higher Tg can readily be made, but their particle size is relatively greater.

Non-ionic water-soluble activator compounds, which are suitable as a component of the redox-type polymerisation initiator system in combination with hydrogen peroxide, include, for example, ascorbic acid, sulphur compounds such as thiourea and mercaptans, amines such as hydroxylamine, triethylamine and ethanolamine, reducing acids such as glycollic acid and tartaric acid, benzilic acid and benzyl alcohol.

The amounts used in the process of the hydrogen peroxide and the activator compound may vary widely according to such factors as the particular monomers being polymerised, the molecular weight which it is sought to attain and the rate of polymerisation desired. The hydrogen peroxide is typically employed in an amount of from 0.003% to 6.0% by weight of the monomer being polymerised. The activator compound is typically employed in an amount of from 0.01% to 7.5% by weight of the monomer; the amount taken is suitably approximately equimolar in relation to the amount of hydrogen peroxide, but it may range from a substantial excess (say 33%) over that amount to as little as 25% of that amount, in the latter case particularly when the higher proportions of hydrogen peroxide to monomer are employed. Optimum amounts of these two materials may always readily be determined for individual polymerisation systems by simple experiment.

In addition to the initiator system, the polymerisation process of the invention requires the presence of a compound containing in the molecule a polymer chain of minimum molecular weight 400 which is per se soluble in the aqueous phase and a copolymerisable unsaturated grouping. This compound is believed to function as a precursor for the production in situ of a graft copolymer which effects the steric stabilisation of the polymer particles produced. It is postulated that the one polymer chain component of this copolymer, being derived from the precursor polymer chain which is soluble in the aqueous phase, provides a steric barrier around the polymer particles whereby flocculation of the latter is prevented; this barrier is anchored to the particle through the medium of the other polymer chain component of the copolymer, which is grafted to the first component and which has an inherent affinity for the polymer particles by virtue of its having a similar monomer composition to the particles themselves.

For the precursor, the polymer chain soluble in the aqueous phase may be derived from any water-soluble polymer, but specially suitable are the polyethylene glycols and their monoalkyl ethers in which the alkyl group contains from 1 to 4 carbon atoms, poly(ethylene oxide)-poly(propylene oxide) copolymers containing at least 40% of ethylene oxide and the monoalkyl ethers of such copolymers, polyvinyl pyrrolidone, polyacrylamide, polymethacrylamide and polyvinyl alcohol. Other water-soluble polymers from which the polymer chain in question may be derived include poly(ethyleneimine), poly(N-acetylethyleneimine) and the corresponding N-propionyl derivative and hydrolysis products thereof, and poly[N-(hydroxyethyl)-N-methyl-methylacrylamide]. The molecular weight of this component is preferably at least 1000, and particularly preferred soluble polymers are the polyethylene glycols, or their monomethyl ethers, of molecular weight in the range 2000–4000. Nevertheless, it is possible to operate the process of the invention using water-soluble polymer chains of molecular weight considerably below these preferred levels, down to a minimum value of 400, which cannot be done in the analogous process of Applications Nos. 8214675 and 3212212 referred to above; this difference may be attributable to the fact that, where azo initiators are used, generally higher polymerisation temperatures are required, e.g. temperatures in the range 75°–80° C. At such temperatures, the ability of relatively short water-soluble polymer chains to provide steric stabilising barriers is impaired; this is not the case at the lower temperatures which are characteristic of the present process.

The unsaturated grouping which is also required to be present in the precursor molecule may conveniently be provided by esterifying such a glycol or ether with a copolymerisable unsaturated acid, such as methacrylic acid, itaconic acid or maleic acid; an example of such a precursor is the methacrylic acid ester of the monomethyl ether of polyethylene glycol of molecular weight 2000. Esterification of the glycol, or ether thereof, may be effected by an ester-interchange reaction with a lower alkyl ester of the unsaturated acid, for example with methyl methacrylate; alternatively the glycol or its ether may be reacted with a suitable acid chloride, for example methacrylyl chloride, in the presence of a hydrogen chloride acceptor. Yet again, the glycol or its ether may be reacted directly with the unsaturated acid to give the ester, or with its anhydride to form a half-ester. Other suitable precursors may be obtained by reacting a carboxyl group-terminated polyvinylpyrrolidone (see British Specification No. 1,096,912) with glycidyl methacrylate. Yet other suitable precursors may be obtained by the procedure described in our published British Patent Application No. 2051096A; that is to say by reacting a water-soluble polyalkylene glycol or its monoalkyl ether with a cyclic aliphatic carboxylic anhydride and then reacting the resulting half-ester with an epoxy compound containing a polymerisable double bond. For example, the monoethyl ether of a polyethylene glycol is reacted with succinic anhydride and the product then condensed with glycidyl methacrylate to give a precursor containing a terminal vinyl grouping. As explained in the published Application referred to, this method of making a precursor is convenient because it avoids the necessity of removing any by-products or excess reagents, which could interfere with the subsequent use of the precursor, that arises with most of the other methods discussed above. Another suitable precursor is the monomethyl monovinylbenzyl ether of polyethylene glycol, obtained by reacting vinylbenzyl chloride with the sodium derivative of the monomethyl ether of polyethylene glycol.

The precursor may contain one, or more than one, unsaturated grouping in the molecule.

The proportion of the precursor compound which is added to the polymerisation mixture, in performing the process of the invention, will vary to some extent according to the particular disperse polymer which is being produced and the disperse particle size which it is desired that the resulting dispersion should have, but the optimum proportion in any individual case can readily be found by simple experiment. Typical proportions of precursor are in the range 0.5–20%, and more especially 5–10%, of the weight of monomer which is to be polymerised.

The first step in carrying out the process of the invention is the emulsification of the monomer or monomers to be polymerised, in the aqueous phase of the polymerisation mixture which will normally contain not only water but also the precursor from which the stabiliser is to be derived. It may be possible to secure and maintain an emulsion of monomer droplets of a sufficient degree of fineness by merely subjecting the polymerisation mixture to high-shear or ultrasonic treatment, but usually it will be desirable to include in the mixture a surfactant whereby emulsification can be assisted. Such a surfactant must, of course, be of the non-ionic type in order to accord with the object of the invention of producing a polymer dispersion totally free from ionic or charged species. Examples of suitable non-ionic surfactants include the ethylene oxide condensates of alkylphenols, e.g. the condensate of 1 mol of nonylphenol with 20 mols of ethylene oxide (commercially available as "Levelan" P208) or the oleic acid ester of polyethylene glycol, mol.wt. 400 (commercially available as "Ethylan" A4) ("Levelan" and "Ethylan" are Registered Trade Marks).

Instead of employing a conventional non-ionic surfactant such as those just mentioned, however, it is possible to employ a substance which combines in one molecule the function of surfactant and the function of the precursor compound.

Thus, according to a further embodiment of the invention, there is provided a polymerisation process in which (i) at least one ethylenically unsaturated monomer, having a solubility in water in the range 0.08%–8% by weight but giving rise to a polymer which is insoluble in water, is emulsified in water in the presence of a non-ionic surface-active compound which comprises in the molecule (a) a component of molecular weight at least 400 which is per se soluble in the aqueous phase, (b) another component of molecular weight in the range 150–1000 which is per se soluble in the monomer phase and (c) an unsaturated grouping which is capable of copolymerising with the monomer or monomers, the said grouping being attached to or integral with the monomer-soluble component aforementioned, and (ii) the emulsified monomer is then subjected to polymerisation in the additional presence of a redox-type polymerisation initiator system comprising hydrogen peroxide in combination with a non-ionic water-soluble activator compound.

As in the case where a conventional non-ionic surfactant is used, the emulsification of the monomer may be expedited by subjecting the polymerisation mixture to high-shear or ultrasonic treatment, but normally a conventional stirring action in the presence of the surfactant precursor compound will suffice.

As defined above, the surfactant precursor compound comprises in the molecule three distinct features.

Firstly, there is present a component of molecular weight at least 400, preferably at least 1000, which is per se soluble in the aqueous phase of the polymerisation mixture. Suitable such components include those which have already been described as being suitable as the analogous component of a simple precursor compound (i.e. a precursor which does not possess surface-active properties).

Secondly, there is present a component of molecular weight in the range 150–1000 which is per se soluble in the monomer phase of the polymerisation mixture; thus, whereas the first-mentioned component is hydrophilic in character, this second component is of a hydrophobic nature. Suitable such components include chains derived from the self-condensation or co-condensation of propylene oxide, butylene oxide or styrene oxide, or hydrocarbon chains such as that derived from a higher fatty acid or fatty alcohol. These first and second components together confer the surface-active properties on the compound which are required for emulsification of the monomer or monomers. Preferably the first, or hydrophilic, component and the second, or hydrophobic, component should be present in a weight ratio lying in the range from 20:1 to 1:1.

The third feature of the surfactant precursor compound, which is attached to or is integral with the second or hydrophobic component, is an unsaturated grouping capable of copolymerising with the monomer or monomers being polymerised. Preferably the unsaturated grouping is attached to or is integral with the portion of the hydrophobic component which is most remote from the hydrophilic component. Where the hydrophobic component is a polymer chain containing a hydroxyl group, for example a poly(oxybutylene) chain terminated by such a group, the unsaturated grouping may conveniently take the form of the ester of the component in question with a copolymerisable unsaturated acid, such as methacrylic acid, itaconic acid or maleic acid. The production of such an ester may consist in carrying out an ester-interchange reaction between a lower alkyl ester of the acid, for example methyl methacrylate, and the compound constituting the remainder of the precursor molecule, e.g. the monomethyl ether of a poly(oxyethylene)-poly(oxybutylene)-copolymer. Such an ester may also be obtained by reacting the copolymer with a suitable unsaturated acid chloride, in the presence of a hydrogen chloride acceptor. Examples of suitable surfactant precursor compounds of this ester type include unsaturated block copolymers of the formula:

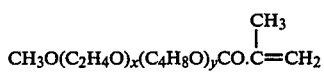

where x and y have values corresponding to molecular weights for the poly(oxyethylene) and poly(oxybutylene) blocks of, for example, 2000 and 700 respectively. These substances are readily obtained by condensing methanol with ethylene oxide and subsequently with butylene oxide in the requisite proportions, and then reacting the product with methacrylyl chloride, or carrying out an ester interchange reaction between the product and methyl methacrylate in the presence of a catalytic amount of tetra-isopropyl titanate.

Alternatively, suitable surfactant precursor compounds may be obtained by the successive condensation of, for example, butylene oxide and ethylene oxide with a hydroxylic compound already containing the requisite copolymerisable unsaturated grouping. For example, allyl alcohol may be condensed successively with butylene oxide and with ethylene oxide to give a block copolymer of the formula:

$$CH_2=CH.CH_2.O(C_4H_8O)_y(C_2H_4O)_xH$$

where x and y have the same values as above. Other useful compounds of this type are obtained by condensing the triallyl ether of pentaerythritol successively with butylene oxide and with ethylene oxide in molar proportions such as 1:2:35, 1:4:35, 1:4:46 and 1:4:65.

As a further alternative, the hydrophobic component of the surfactant precursor compound may be provided by a hydrocarbon chain, which may also incorporate the unsaturated grouping. An example of such a chain is that in undecylenic acid, and this may be converted to the required surfactant precursor by direct condensation with ethylene oxide, for example in a molar ratio of 1:35.

When performing the invention with the aid of a conventional surfactant and a simple precursor compound, the amount of the surfactant used will depend upon the particular monomer or monomers to be emulsified and the fineness of the emulsion which is desired, as well as upon the efficiency of the particular surfactant. The optimum proportion can readily be established by experiment, but will normally lie in the range 0.5% to 10% by weight of the monomer taken. In the case where a surfactant precursor compound is used, the same considerations apply but with the proviso that the proportion employed should also be sufficient to generate the necessary graft copolymer whereby steric stabilisation of the polymer particles is effected. Accordingly, the proportion of surfactant precursor used is preferably of the same order as the proportion of simple (non-surfactant) precursor employed in the first case, that is to say in the range 0.5–20%, more especially 5–10%, by weight of the monomer taken. Although it is not normally necessary, the invention may be performed with the aid of a conventional surfactant in addition to a surfactant precursor compound.

In carrying out the process of the invention by either of the main embodiments described above, it is possible to introduce the whole of the monomer or monomers to be polymerised into the aqueous medium all at once; this may conveniently be described as a "one-shot" procedure. As already indicated, this monomer becomes emulsified in the aqueous medium and provides a reservoir from which monomer is gradually drawn as polymerisation proceeds until all of it has been converted to disperse polymer. An alternative, and preferred, procedure is to add initially to the aqueous medium part of the monomer only, this being emulsified and allowed to polymerise to form a dispersion of fine "seed" polymer particles, after which the remainder of the monomer is added either gradually or portion-wise, with resulting growth of the particles. This may be referred to as a "seed and feed" process; its chief advantage is that it enables better control of the particle size of the polymer dispersion to be achieved. It is also then possible to vary the composition of the monomer feed, that is to say, a different monomer or mixture of monomers may be added at the beginning of the "feed" stage from that added later in the same stage. In this way, it can be arranged that the latex polymer particles have a "layered" structure, consisting of a core of one monomer composition and one or more surrounding shells of different composition. For example, by the inclusion of a polyfunctional monomer in the initial feed only, a particle may be obtained having a crosslinked core and an outer shell of non-crosslinked polymer. Alternatively, the outer shell only can be arranged to carry functional groups, such as hydroxyl or epoxide groups, derived from monomers bearing such groups.

The redox polymerisation initiator system is introduced into the reaction mixture along with the monomer or monomers, the hydrogen peroxide and the non-ionic activator being dissolved separately in small quantities of water and then added simultaneously to the reaction mixture. In the case of a "one-shot" procedure, the whole of the initiator system required may be introduced all at once. Where a "seed and feed" procedure is employed, it is preferred to add the initiator in portions corresponding to the additions of the monomer(s).

There may also be present in the polymerisation mixture a water-soluble chain transfer agent. Examples of suitable agents are mercaptoethanol and thioglycollic acid. The chain transfer agent may be used in an amount of from 0.1% to 2% of the weight of monomer. The effect of the chain transfer agent is to regulate the molecular weight of the disperse polymer and ultimately to reduce the proportion of finer particles in the disperse phase, thus increasing the average particle size.

In general, the polymerisation process is carried out following the operational procedures and employing the equipment (e.g. reaction vessel and stirrer configuration) which are well established in the emulsion polymerisation field and which are well known to those skilled in the art. The process may be performed at various temperatures, depending on the particular monomer or monomers being polymerised, the particular initiator system employed and the rate of polymerisation desired. As indicated above, the temperature chosen should not be so high that the solvatable component of the stabiliser ceases to be effectively solvated by the aqueous phase. It is, however, a feature of the use in the process of a redox-type initiator system that the polymerisation can in general be carried out at significantly lower temperatures than those required in aqueous emulsion polymerisations employing an azo-type initiator. In most cases, the temperature will not need to exceed 50° C.

Stemming from this possibility of using a relatively low polymerisation temperature, coupled with the absence from the reaction mixture of any ionic material, the process of the invention has the further surprising advantage that it enables aqueous dispersions to be made of polymers or copolymers of monomers which contain reactive groups and are normally regarded as being "water-sensitive" and are in practice polymerisable by the standard aqueous emulsion polymerisation techniques, using persulphate initiation, only as very minor constituents of mixtures with other monomers, if indeed they can be polymerised successfully in this way at all. Thus, for example, it is found that it is not possible to polymerise by the standard techniques monomer mixtures containing more than 5-6% by weight of glycidyl methacrylate without thickening or flocculation of the dispersion produced occurring. Under very specialised conditions (polymerisation at 0°-5° C. using ultraviolet-activated initiation by an azo amidine hydrochloride), Okobu succeeded in copolymerising a monomer mixture containing 13.5% of glycidyl methacrylate (Chem.Abs., 95 (14), 116276K). In contrast, we have encountered no difficulty in copolymerising by the present process monomer mixtures containing 25%, or even 50%, by weight of glycidyl methacrylate. "Water-sensitive" reactive monomers which can thus be successfully polymerised in substantial proportions include glycidyl acrylate, glycidyl methacrylate and γ-methacryloxypropyltrimethoxysilane. As an alternative to the use of the last-mentioned of these three reactive monomers, "siliconised" addition polymer latices may readily be prepared by the present process by including in the monomer mixture being polymerised a hydroxyl group-bearing monomer such as hydroxyisopropyl methacrylate and feeding in together with this mixture tetraethyl silicate; the latter reacts with the hydroxyl groups during the polymerisation, resulting in the attachment of silicon-containing groupings to the polymer molecule. Under the particular conditions of the present process, hydrolysis of, and subsequent formation of a precipitate from, the tetraethyl silicate does not occur to any significant extent.

In addition to the advantages of greater latitude in choice of monomer composition and of the steric stabilising entity, the process of the present invention has the virtue over the process of Applications Nos. 8214675 and 8312212 of requiring only a commonly accessible initiator and activator. The water-soluble, monomer-insoluble azo initiators referred to in the said application are not as yet widely available.

A still further advantage of the invention is that the polymer obtained in latex form, being wholly stabilised by steric means, can if desired be flocculated and separated from the aqueous phase by the simple expedient of heating the latex to a temperature at which the water-soluble polymer chains cease to exert their stabilising effect. For example, where the water-soluble chains are derived from a methoxypolyethylene glycol of molecular weight 2000, flocculation of the disperse polymer occurs on heating to 92° C. or above. At a chain molecular weight of 600, the critical flocculation temperature is 60°-70° C.

At temperatures below the critical flocculation value, the latices obtained by the present process are stable for indefinite periods of time and are also unaffected by changes in pH, addition of polyvalent ions or freeze-thaw conditions, all of which adversely affect the stability of charge-stabilised latices. The latices are valuable as the basis of water-borne aqueous coating compositions for which a high degree of formulation freedom is available; for example, account need not be taken of the presence of ionic material in other constituents of the composition, such as pigments.

The invention is illustrated but not limited by the following Examples, in which percentages are by weight. The polymer latices obtained were subjected to determination of particle size and distribution by means of the "Nanosizer" (Registered Trade Mark), an instrument marketed in the U.K. by Coulter Electronics Limited. The results of this determination are expressed by two numbers, e.g. 3:361; the first number is a measure of the degree of polydispersity of the latex particles on an arbitrary scale from 0 (monodisperse) to 10, and the second number is the average size of the particles in nanometers.

EXAMPLES

In all the following Examples, polymerisation was carried out at a temperature of 50° C. in a "culture vessel" (i.e. a reaction vessel having a flat bottom and vertical sides) equipped with means for maintaining a nitrogen atmosphere, a reflux condenser and a stirrer of either the anchor type, having blades of polytetrafluoroethylene, or the stainless steel turbine type. Monomers, fed in either by metering pumps or from burettes, were directed into the vortex created by the stirrer in the aqueous reaction mixture; hydrogen peroxide initiator and activator were separately dissolved in water and the solutions added at mutually corresponding rates by direction into the same vortex, preferably with the aid of peristaltic pumps.

The Examples all illustrate a "seed-and-feed" procedure; Examples 1-12 show the use of a conventional surfactant in conjunction with a simple precursor, while Examples 13-18 show the use of a surfactant precursor.

EXAMPLE 1

This Example illustrates the preparation of a latex of 48/42/10 copolymer of methyl methacrylate, butyl acrylate and hydroxyisopropyl methacrylate, having Tg (glass transition temperature) of 15° C.

| Initial charge | |
|---|---|
| Demineralised water | 200 g |
| Condensate of nonylphenol with 20 mols ethylene oxide* | 2.2 g |
| Methacrylic ester of monoethyl ether of polyethylene glycol mol. wt. 2000+ | 2.2 g |
| "Seed" monomers | |
| Methyl methacrylate | 9.6 g |
| Butyl acrylate | 8.3 g |
| "Seed" initiator | |
| Hydrogen peroxide, 20 vols. | 0.048 g |
| Water | 2.0 g |
| Ascorbic acid | 0.02 g |
| Water | 2.0 g |
| First "feed" charge | |
| Methyl methacrylate | 69.8 g |
| Butyl acrylate | 60.8 g |
| Hydroxyisopropyl methacrylate | 16.8 g |
| Surfactant A | 5.9 g |
| Precursor A | 8.8 g |
| First "feed" initiator | |
| Hydrogen peroxide, 20 vols. | 0.12 g |
| Water | 11.0 g |
| Ascorbic acid | 0.05 g |
| Water | 11.0 g |
| Second "feed" charge | |
| Methyl methacrylate | 17.2 g |
| Butyl acrylate | 14.2 g |
| Hydroxyisopropyl methacrylate | 3.6 g |
| Surfactant A | 1.4 g |
| Second "feed" initiator | |
| Hydrogen peroxide, 20 vols. | 0.024 g |
| Water | 1.0 g |
| Ascorbic acid | 0.01 g |
| Water | 1.0 g |
| Final initiator "spike" | |
| Hydrogen peroxide, 20 vols. | 0.024 g |

| | |
|---|---|
| Water | 1.0 g |
| Ascorbic acid | 0.01 g |
| Water | 1.0 g |

*hereinafter referred to as 'Surfactant A'
+hereinafter referred to as 'Precursor A'

The initial aqueous charge was heated to 50° C. under nitrogen and the "seed" monomer charge was added with stirring. The "seed" initiator solutions were then added; after a fine seed-stage latex had formed, the first "feed" charge and initiator were introduced gradually over a period of 3 hours. The second "feed" charge and initiators were then fed in over a period of 1 hour; finally, the initiator "spike" was added and, after 20 minutes' further heating, the reaction mixture was cooled.

The resulting latex, after removal of about 1 g of coagulum, gave a result on "Nanosizer" examination of 0:169. It had a solids content of 48.5% and the monomer conversion was 98%. The total amounts of stabiliser precursor and surfactant used were 5.5% and 4.7% respectively based on the monomers taken. The amounts of initiator and activator, on the same basis, were 0.006% and 0.05% respectively. The latex had negligible electrophoretic mobility at pH<9, and on heating to 92° C. it underwent flocculation. Both these observations indicate the absence of ionic material and that the mode of stabilisation of the polymer particles is steric.

EXAMPLE 2

This Example shows the preparation of a latex of the same copolymer as in Example 1, but using a lower level of the emulsifier and slightly lower levels of hydrogen peroxide and ascorbic acid activator.

The procedure of Example 1 was repeated using the same quantities of materials, except as follows:

| | |
|---|---|
| "Seed" initiator | |
| Hydrogen peroxide, 20 vols. | 0.024 g |
| Water | 1.0 g |
| Ascorbic acid | 0.01 g |
| Water | 1.0 g |
| First "feed" charge | |
| Methyl methacrylate | 69.8 g |
| Butyl acrylate | 60.8 g |
| Hydroxyisopropyl methacrylate | 16.8 g |
| Surfactant A | 1.48 g |
| Precursor A | 8.8 g |
| Second "feed" charge | |
| Methyl methacrylate | 17.2 g |
| Butyl acrylate | 14.2 g |
| Hydroxyisopropyl methacrylate | 3.6 g |
| Surfactant A | 0.35 g |

No final initiator "spike" was used in this case.

The latex obtained contained about 4 g of coagulum. After this had been removed, "Nanosizer" examination of the latex gave a result of 2:175. The solids content was 45% and the monomer conversion 92%. The total amounts of stabiliser precursor and surfactant were 5.5% and 2.0% respectively, based on total monomer, and the total amounts of initiator and activator were 0.005% and 0.04% respectively, on the same basis.

EXAMPLE 3

This Example illustrates the preparation of a latex of the same copolymer as in Examples 1 and 2, but using a stabiliser precursor of lower molecular weight.

The procedure of Example 1 was repeated with the same materials in the same quantities, except that the methacrylic ester of the monomethyl ether of polyethylene glycol, mol. wt. 2000 was replaced by an equal amount of the methacrylic ester of the monomethyl ether of polyethylene glycol, mol. wt. 500 and the initiator charges were altered as follows:

| | |
|---|---|
| "Seed" initiator | |
| Hydrogen peroxide, 20 vols. | 4.8 g |
| Ascorbic acid | 0.4 g |
| Water | 5.0 g |
| First "feed" initiator | |
| Hydrogen peroxide, 20 vols. | 12.0 g |
| Water | 8.0 g |
| Ascorbic acid | 1.0 g |
| Water | 19.0 g |
| Second "feed" initiator | |
| Hydrogen peroxide, 20 vols. | 5.0 g |
| Water | 5.0 g |
| Ascorbic acid | 0.4 g |
| Water | 10.0 g |

No final initiator "spike" was used in this case.

The resulting latex, after separation of a very small amount of coagulum, gave on "Nanosizer" examination a result of 2:131. The solids content was 44.7% and the monomer conversion 94.8%. The amounts of stabiliser precursor and surfactant were in total 5.5% and 4.7% respectively, and of initiator and activator 0.6% and 0.9% respectively, based in all cases on the monomers taken. The latex flocculated on heating to 72°–77° C.

EXAMPLE 4

This Example illustrates the preparation of a stable latex of a copolymer containing a substantial proportion of a "reactive" monomer, viz. glycidyl methacrylate.

The procedure of Example 1 was repeated, using the following charges:

| | |
|---|---|
| Initial charge | |
| Deionised water | 200 g |
| Surfactant A | 2.2 g |
| Precursor A | 2.2 g |
| "Seed" monomers | |
| Methyl methacrylate | 10 g |
| Butyl acrylate | 8 g |
| "Seed" initiator | |
| Hydrogen peroxide, 20 vols. | 4.8 g |
| Ascorbic acid | 0.4 g |
| Water | 4.0 g |
| First "feed" charge | |
| Methyl methacrylate | 48 g |
| Butyl acrylate | 65 g |
| Glycidyl methacrylate | 38 g |
| Surfactant A | 6 g |
| Precursor A | 9 g |
| First "feed" initiator | |
| Hydrogen peroxide, 20 vols. | 12 g |
| Ascorbic acid | 1 g |
| Water | 12 g |
| Second "feed" charge | |
| Methyl methacrylate | 10 g |
| Butyl acrylate | 13 g |
| Glycidyl methacrylate | 7 g |
| Surfactant A | 1.2 g |

-continued

| Second "feed" initiator | |
|---|---|
| Hydrogen peroxide, 20 vols. | 5 g |
| Water | 4 g |
| Ascorbic acid | 0.4 g |
| Water | 9 g |

The product was a latex of copolymer of the composition methyl methacrylate/butyl acrylate/glycidyl methacrylate 34/43/23, having a Tg of 5° C. After separation of a very small amount of coagulum, this latex gave a result of 1:163 on "Nanosizer" determination. The solids content was 46.7% and the monomer conversion 95.5%. Total amounts of stabiliser precursor, surfactant, initiator and activator were 5.6%, 4.75%, 0.65% and 0.9% respectively, based on total monomer.

EXAMPLE 5

This is a repetition of Example 4 on a larger scale and using a different surfactant in the "feed" charges.

The procedure of Example 1 was repeated, using the following charges:

| Initial charge | |
|---|---|
| Deionised water | 1000 g |
| Surfactant A | 11 g |
| Precursor A | 11 g |
| "Seed" monomers | |
| Methyl methacrylate | 50 g |
| Butyl acrylate | 40 g |
| "Seed" initiator | |
| Hydrogen peroxide, 100 vols. | 4.8 g |
| Ascorbic acid | 2.0 g |
| Water | 5.0 g |
| First "feed" charge | |
| Methyl methacrylate | 240 g |
| Butyl acrylate | 325 g |
| Glycidyl methacrylate | 190 g |
| Oleic acid ester of polyethylene glycol mol. wt. 400* | 30 g |
| Precursor A | 45 g |
| First "feed" initiator | |
| Hydrogen peroxide, 100 vols. | 12 g |
| Water | 18 g |
| Ascorbic acid | 5 g |
| Water | 25 g |
| Second "feed" charge | |
| Methyl methacrylate | 50 g |
| Butyl acrylate | 65 g |
| Glycidyl methacrylate | 35 g |
| Surfactant B | 6 g |
| Second "feed" initiator | |
| Hydrogen peroxide, 100 vols. | 5 g |
| Water | 10 g |
| Ascorbic acid | 2 g |
| Water | 13 g |

*hereinafter referred to as Surfactant B

The resulting latex contained some 'bits' which were removed by filtration. "Nanosizer" examination of the filtered material gave a result of 2:162. The solids content and monomer conversion were 48% and 95.6% respectively. The total amounts of stabiliser precursor, surfactant, initiator and activator were 5.6%, 4.75%, 1.6% and 1.4% respectively, based on total monomer.

EXAMPLE 6

In this Example, the level of initiator is reduced as compared with Examples 4 and 5; the copolymer composition is unchanged.

The procedure of Example 4 was repeated, except that the initiator charges were altered as follows:

| "Seed" initiator | |
|---|---|
| Hydrogen peroxide, 20 vols. | 0.048 g |
| Water | 2.0 g |
| Ascorbic acid | 0.004 g |
| Water | 2.0 g |
| First "feed" initiator | |
| Hydrogen peroxide, 20 vols. | 0.12 g |
| Water | 20 g |
| Ascorbic acid | 0.01 g |
| Water | 20 g |
| Second "feed" initiator | |
| Hydrogen peroxide, 20 vols. | 0.048 g |
| Water | 2.0 g |
| Ascorbic acid | 0.004 g |
| Water | 2.0 g |

After removal of a very small amount of coagulum, the resulting latex gave a result of 1:171 on "Nanosizer" examination. The solids content was 41.2% and monomer conversion 87.8%. The stabiliser precursor and surfactant levels were the same as in Examples 4 and 5, but the initiator and activator levels were 0.006% and 0.009% respectively, based on total monomer.

EXAMPLE 7

This Example shows the inclusion of a chain-transfer agent in the polymerisation mixture.

The procedure of Example 4 was repeated, except for the following alterations to some of the charges:

| "Seed" initiator | |
|---|---|
| Hydrogen peroxide, 20 vols. | 4.8 g |
| Water | 5.0 g |
| Ascorbic acid | 2.0 g |
| Water | 10.0 g |
| First "feed" charge | |
| Methyl methacrylate | 48 g |
| Butyl acrylate | 65 g |
| Glycidyl methacrylate | 38 g |
| Surfactant A | 6 g |
| Precursor A | 9 g |
| Ethyl 2-bromo-2-methylpropionate | 0.83 g |
| First "feed" initiator | |
| Hydrogen peroxide, 20 vols. | 12 g |
| Water | 15 g |
| Ascorbic acid | 5 g |
| Water | 15 g |
| Second "feed" charge | |
| Methyl methacrylate | 10 g |
| Butyl acrylate | 13 g |
| Glycidyl methacrylate | 7 g |
| Surfactant A | 1.2 g |
| Ethyl 2-bromo-2-methylpropionate | 0.17 g |
| Second "feed" initiator | |
| Hydrogen peroxide, 20 vols. | 5.0 g |

| Water | 5.0 g |
|---|---|
| Ascorbic acid | 2.0 g |
| Water | 10.0 g |

The resulting latex contained a very small amount of coagulum; after separation from this, the latex gave a result of 1:164 on "Nanosizer" examination. The latex had solid content 42% and the monomer conversion was 93%. The initiator and activator levels were 0.65% and 4.5% respectively, based on total monomer; the stabiliser precursor and surfactant levels were the same as in Example 4.

EXAMPLE 8

This Example illustrates the incorporation into the latex polymer of a different "reactive" monomer from that shown in Examples 4-7.

The procedure of Example 1 was repeated, using the following charges:

| Initial charge | |
|---|---|
| Deionised water | 200 g |
| Surfactant A | 2.2 g |
| Precursor A | 2.2 g |
| "Seed" monomers | |
| Methyl methacrylate | 9.6 g |
| Butyl acrylate | 8.3 g |
| "Seed" initiator | |
| Hydrogen peroxide, 20 vols. | 4.8 g |
| Ascorbic acid | 0.4 g |
| Water | 5.0 g |
| First "feed" charge | |
| Methyl methacrylate | 80 g |
| Butyl acrylate | 80 g |
| γ-Methacryloxypropyl tri-methoxysilane | 8 g |
| Surfactant A | 6.72 g |
| Precursor A | 9.24 g |
| First "feed" initiator | |
| Hydrogen peroxide, 20 vols. | 12 g |
| Water | 8 g |
| Ascorbic acid | 1 g |
| Water | 19 g |
| Second "feed" charge | |
| Methyl methacrylate | 15 g |
| Butyl acrylate | 15 g |
| γ-Methacryloxypropyl tri-methoxysilane | 3.0 g |
| Surfactant A | 1.26 g |
| Second "feed" initiator | |
| Hydrogen peroxide, 20 vols. | 5 g |
| Water | 10 g |
| Ascorbic acid | 0.4 g |
| Water | 10 g |

The resulting latex contained about 1 g of coagulum; after removal of the latter, the latex gave a result of 1:159 on "Nanosizer" examination. The solids content was 47.8% and the monomer conversion 97.9%. The total amounts of stabiliser precursor and surfactant were 5.2% and 4.7% respectively, and the total amounts of initiator and activator 0.59% and 0.8% respectively, all based on the total monomers. The latex polymer had the composition methyl methacrylate/butyl acrylate/γ-methacryloxypropyl trimethoxysilane 48/47/5.

EXAMPLE 9

This Example illustrates the production of a latex polymer having a crosslinked core, through the inclusion of a polyfunctional monomer in the initial "feed" charge, together with an outer shell carrying functional groups derived from a "reactive" monomer present in the second "feed" charge.

The procedure of Example 1 was repeated, using the following charges:

| Initial charge | |
|---|---|
| Deionised water | 200 g |
| Surfactant A | 2.2 g |
| Precursor A | 2.2 g |
| "Seed" monomers | |
| Methyl methacrylate | 9.6 g |
| Butyl acrylate | 8.3 g |
| "Seed" initiator | |
| Hydrogen peroxide, 20 vols. | 0.024 g |
| Water | 1.0 g |
| Ascorbic acid | 0.01 g |
| Water | 1.0 g |
| First "feed" charge | |
| Methyl methacrylate | 71.7 g |
| Butyl acrylate | 71.7 g |
| Allyl methacrylate | 4.0 g |
| Surfactant A | 5.9 g |
| Precursor A | 8.8 g |
| First "feed" initiator | |
| Hydrogen peroxide, 20 vols. | 0.12 g |
| Water | 10.0 g |
| Ascorbic acid | 0.05 g |
| Water | 10.0 g |
| Second "feed" charge | |
| Methyl methacrylate | 10 g |
| Butyl acrylate | 15 g |
| Glycidyl methacrylate | 10 g |
| Surfactant A | 1.4 g |
| Second "feed" initiator | |
| Hydrogen peroxide, 20 vols. | 0.048 g |
| Water | 10.0 g |
| Ascorbic acid | 0.02 g |
| Water | 10.0 g |

The resulting latex polymer had the overall composition methyl methacrylate/butyl acrylate/allyl methacrylate/glycidyl methacrylate 46/47/2/5 and it had a Tg of 15° C. "Nanosizer" examination of the latex, after removal of about 2 g of coagulum, gave a result of 1:194. The solids content and monomer conversion were 46.5% and 98% respectively. The total amounts of stabiliser precursor, surfactant, initiator and activator taken were 5.5%, 4.7%, 0.006% and 0.05% respectively, all based on the total monomer.

EXAMPLE 10

This Example illustrates the use of a different polyfunctional monomer from that shown in Example 9; in this case also the polymer particle obtained had a "core-shell" structure.

The procedure of Example 9 was repeated, except for alteration of certain of the charges, as follows:

| First "feed" charge | |
|---|---|
| Methyl methacrylate | 71.5 g |
| Butyl acrylate | 71.5 g |
| 1:6-Hexanediol diacrylate | 4.0 g |
| Surfactant A | 5.9 g |
| Precursor A | 8.8 g |
| First "feed" initiator | |
| Hydrogen peroxide, 20 vols. | 0.144 g |
| Water | 12 g |
| Ascorbic acid | 0.06 g |
| Water | 12 g |

The resulting latex contained only a very small amount of coagulum; after this had been separated, the latex gave on "Nanosizer" examination a result of 1:218. The solids content was 44.6% and the monomer conversion 91%. The amounts of surfactant precursor, surfactant, initiator and activator used were substantially the same as in Example 9. The latex polymer has the composition methyl methacrylate/butyl acrylate/hexanediol diacrylate/glycidyl methacrylate 46/47/2/5 and it had a Tg of 15° C.

EXAMPLE 11

This Example shows an analogous procedure to that of Example 9, where the particle shell is caused to carry hydroxyl and carboxyl groups instead of epoxide groups.

The procedure of Example 1 was repeated, using the following charges:

| Initial charge | |
|---|---|
| Deionised water | 200 g |
| Surfactant A | 0.9 g |
| Precursor A | 0.5 g |
| "Seed" monomers | |
| Methyl methacrylate | 1.94 g |
| Butyl acrylate | 2.10 g |
| "Seed" initiator | |
| Hydrogen peroxide, 20 vols. | 0.024 g |
| Water | 1.0 g |
| Ascorbic acid | 0.01 g |
| Water | 1.0 g |
| First "feed" charge | |
| Methyl methacrylate | 31.9 g |
| Butyl acrylate | 33.9 g |
| Allyl methacrylate | 2.16 g |
| Surfactant A | 2.7 g |
| Precursor A | 4.5 g |
| First "feed" initiator | |
| Hydrogen peroxide, 20 vols. | 0.12 g |
| Water | 10.0 g |
| Ascorbic acid | 0.05 g |
| Water | 10.0 g |
| Second "feed" charge | |
| Methacrylic acid | 2.97 g |
| Hydroxyethyl acrylate | 4.24 g |
| Butyl acrylate | 13.97 g |
| Surfactant A | 0.9 g |
| Second "feed" initiator | |
| Hydrogen peroxide, 20 vols. | 0.048 g |
| Water | 1.0 g |
| Ascorbic acid | 0.02 g |
| Water | 1.0 g |
| First initiator "spike" | |
| Hydrogen peroxide, 20 vols. | 0.024 g |
| Water | 1.0 g |
| Ascorbic acid | 0.01 g |
| Water | 1.0 g |
| Second initiator "spike" | |
| Hydrogen peroxide, 20 vols. | 0.12 g |
| Water | 1.5 g |
| Ascorbic acid | 0.05 g |
| Water | 1.5 g |

The second initiator "spike" in this case was added to the polymerisation mixture about 30 minutes after the first "spike" and heating at 50° C. was continued for a further 2½ hours.

The resulting latex was almost free from coagulum and gave a "Nanosizer" result of 1:175. The solids content was 29.3% and the monomer conversion 93.9%. The total amounts of stabiliser precursor and surfactant used were 5.4% and 4.8% respectively, and the total amounts of initiator and activator 0.016% and 0.11% respectively, all based on total monomers. The latex polymer had the composition methyl methacrylate/butyl acrylate/allyl methacrylate/methacrylic acid/hydroxyethyl acrylate 36/54/2/3/5.

EXAMPLE 12

This Example shows the production of a "siliconised" latex polymer through the use of tetraethyl silicate in conjunction with a hydroxyl group-containing monomer.

The procedure of Example 1 was repeated, using the following charges:

| Initial charge | |
|---|---|
| Deionised water | 200 g |
| Surfactant A | 2.2 g |
| Precursor A | 2.2 g |
| "Seed" monomers | |
| Methyl methacrylate | 9.6 g |
| Butyl acrylate | 8.3 g |
| "Seed" initiator | |
| Hydrogen peroxide, 20 vols. | 4.8 g |
| Ascorbic acid | 0.4 g |
| Water | 5.0 g |
| First "feed" charge | |
| Methyl methacrylate | 69.8 g |
| Butyl acrylate | 60.8 g |
| Hydroxyisopropyl methacrylate | 16.8 g |
| Tetraethyl silicate | 7.5 g |
| Surfactant C* | 5.9 g |
| Precursor A | 8.8 g |
| First "feed" initiator | |
| Hydrogen peroxide, 20 vols. | 12.0 g |
| Water | 8.0 g |
| Ascorbic acid | 1.0 g |
| Water | 19.0 g |
| Second "feed" charge | |
| Methyl methacrylate | 17.2 g |
| Butyl acrylate | 14.2 g |
| Hydroxyisopropyl methacrylate | 3.6 g |
| Tetraethyl silicate | 2.5 g |
| Surfactant C | 1.4 g |
| Second "feed" initiator | |
| Hydrogen peroxide, 20 vols. | 5.0 g |
| Water | 5.0 g |
| Ascorbic acid | 0.4 g |

| -continued | |
|---|---|
| Water | 10.0 g |

*Surfactant C is the condensate of nonylphenol with 30 molar proportions of ethylene oxide.

The resulting latex contained a very small amount of coagulum, which was removed by filtration. The filtered material gave, on "Nanosizer" examination, the result 1:164. The total amounts of stabiliser precursor, surfactant, initiator and activator used were 5.2%, 4.5%, 0.75% and 1.05% respectively, based on total monomer. The composition of the latex polymer in terms of the starting materials was 46/39/10/5 methyl methacrylate/butyl acrylate/hydroxyisopropyl methacrylate/tetraethylsilicate.

EXAMPLE 13

This Example illustrates the preparation of a latex of a 48/42/10 copolymer of methyl methacrylate, butyl acrylate and hydroxyisopropyl methacrylate, having a Tg (glass transition temperature) of 15° C.

| Initial charge | |
|---|---|
| Deionised water | 200 g |
| Surfactant precursor D (see below) | 4.48 g |

Surfactant precursor D is the product of successive condensation of pentaerythritol triallyl ether with 4 mols. of butylene oxide and 46 mols. of ethylene oxide.

| "Seed" monomers | |
|---|---|
| Methyl methacrylate | 9.6 g |
| Butyl acrylate | 8.3 g |
| "Seed" initiator | |
| Hydrogen peroxide, 20 vols. | 0.024 g |
| Water | 1.0 g |
| Ascorbic acid | 0.01 g |
| Water | 1.0 g |
| First "feed" charge | |
| Methyl methacrylate | 69.8 g |
| Butyl acrylate | 60.8 g |
| Hydroxyisopropyl methacrylate | 16.8 g |
| Surfactant precursor D | 14.74 g |
| First "feed" initiator | |
| Hydrogen peroxide, 20 vols. | 0.12 g |
| Water | 11.0 g |
| Ascorbic acid | 0.05 g |
| Water | 11.0 g |
| Second "feed" charge | |
| Methyl methacrylate | 17.2 g |
| Butyl acrylate | 14.2 g |
| Hydroxyisopropyl methacrylate | 3.6 g |
| Surfactant precursor D | 1.75 g |
| Second "feed" initiator | |
| Hydrogen peroxide, 20 vols. | 0.048 g |
| Water | 1.0 g |
| Ascorbic acid | 0.024 g |
| Water | 1.0 g |

The initial aqueous charge was heated to 50° C. under nitrogen and the "seed" monomer charge was added with stirring. The "seed" initiator solutions were then added; after a fine seed-stage latex had formed, the first "feed" charge and initiator were introduced gradually over a period of 3 hours. The second "feed" charge and initiator were then fed in over a period of 30 minutes; finally, the reaction mixture was held at 50° C. for a further 30 minutes and then cooled.

The resulting latex, after removal by filtration of a very small amount of coagulum, gave on "Nanosizer" examination a result of 2:137. It had a solids content of 46.2% and the conversion of monomer to polymer was 93.3%. The total amounts taken of surfactant precursor, initiator and activator were 10.4%, 0.006% and 0.04%, based on the total weight of monomer.

EXAMPLE 14

This Example shows the preparation of a latex of the same copolymer as in Example 13, but using a different surfactant precursor and slightly higher proportions of hydrogen peroxide initiator and ascorbic acid activator.

The procedure of Example 13 was repeated using the same quantities of materials, except as follows:

(i) the Surfactant precursor D was replaced by a similar amount in each instance of Surfactant precursor E, which was the product of successive condensation of pentaerythritol triallyl ether with 2 mols. of butylene oxide and 35 mols. of ethylene oxide.

(ii) the second "feed" initiator had the composition:

| Hydrogen peroxide, 20 vols. | 0.024 g |
|---|---|
| Water | 1.0 g |
| Ascorbic acid | 0.010 g |
| Water | 1.0 g |

(iii) after the addition of the second "feed" initiator, a further initiator "spike" was added to the reaction mixture, of the composition:

| Hydrogen peroxide, 20 vols. | 0.048 g |
|---|---|
| Water | 1.0 g |
| Ascorbic acid | 0.020 g |
| Water | 1.0 g |

The resulting latex was filtered to remove a very small amount of coagulum and "Nanosizer" examination then gave the result 2:136. The solids content was 44.8% and the monomer conversion was 91.3%. The total amounts used of surfactant precursor, initiator and activator were 10.4%, 0.01% and 0.07% respectively, based on the total weight of monomer.

EXAMPLE 15

This Example illustrates the production of a latex of a polymer similar to that of Example 13, but having a higher Tg.

The procedure of Example 13 was repeated, using the following charges:

| Initial charge | |
|---|---|
| Deionised water | 200 g |
| Surfactant precursor D | 4.48 g |
| "Seed" monomers | |
| Methyl methacrylate | 9.6 g |
| Butyl acrylate | 8.3 g |
| "Seed" initiator | |
| Hydrogen peroxide, 20 vols. | 0.048 g |

-continued

| | |
|---|---|
| Water | 2.0 g |
| Ascorbic acid | 0.02 g |
| Water | 2.0 g |
| First "feed" charge | |
| Methyl methacrylate | 108 g |
| Butyl acrylate | 27 g |
| Hydroxyisopropyl methacrylate | 30 g |
| Surfactant precursor D | 16.5 g |
| First "feed" initiator | |
| Hydrogen peroxide, 20 vols. | 0.12 g |
| Water | 12.0 g |
| Ascorbic acid | 0.05 g |
| Water | 12.0 g |
| Second "feed" charge | |
| Methyl methacrylate | 21 g |
| Butyl acrylate | 5 g |
| Hydroxyisopropyl methacrylate | 3 g |
| Condensate of nonyl phenol with 25 mols ethylene oxide | 1.4 g |
| Second "feed" initiator | |
| Hydrogen peroxide, 20 vols. | 0.048 g |
| Water | 1.0 g |
| Ascorbic acid | 0.02 g |
| Water | 1.0 g |

The resulting latex contained a small amount of coagulum, which was removed by filtration. "Nanosizer" examination of the filtered material gave the result 4:202. The solids content was 46% and the monomer conversion 91%. The total amounts of surfactant precursor, initiator and activator used were 10.5%, 0.006% and 0.04% respectively, based on the total weight of monomer. The monomer composition of the latex polymer was 66/19/16 methyl methacrylate/butyl acrylate/hydroxyisopropyl methacrylate and the polymer had Tg=52° C.

EXAMPLE 16

This Example illustrates the inclusion of a water-sensitive "reactive" monomer in the polymerisation mixture, together with the use of a further different surfactant precursor.

The procedure of Example 13 was repeated, using the following charges:

| Initial charge | |
|---|---|
| Deionised water | 200 g |
| Surfactant precursor F (see below) | 4.4 g |

Surfactant precursor F was the product of successive condensation of pentaerythritol triallyl ether with 4 mols of butylene oxide and 35 mols of ethylene oxide.

| "Seed" monomers | |
|---|---|
| Methyl methacrylate | 10 g |
| Butyl acrylate | 9 g |
| "Seed" initiator | |
| Hydrogen peroxide, 20 vols. | 0.024 g |
| Water | 1.0 g |
| Ascorbic acid | 0.01 g |
| Water | 1.0 g |

| First "feed" charge | |
|---|---|
| Methyl methacrylate | 55 g |
| Butyl acrylate | 55 g |
| Glycidyl methacrylate | 42 g |
| Surfactant precursor F | 14.7 g |
| First "feed" initiator | |
| Hydrogen peroxide, 20 vols. | 0.12 g |
| Water | 15.0 g |
| Ascorbic acid | 0.05 g |
| Water | 15.0 g |
| Second "feed" charge | |
| Methyl methacrylate | 11 g |
| Butyl acrylate | 11 g |
| Glycidyl methacrylate | 8 g |
| Surfactant precursor F | 1.75 g |
| Second "feed" initiator | |
| Hydrogen peroxide, 20 vols. | 0.06 g |
| Water | 5.0 g |
| Ascorbic acid | 0.02 g |
| Water | 5.0 g |

The resulting latex polymer had the monomer composition 38/37/25 methyl methacrylate/butyl acrylate/glycidyl methacrylate, and a Tg of 15° C.; the monomer conversion to polymer was 91%. The latex, after filtration from a very small amount of coagulum, gave a "Nanosizer" reading of 1:135. The solids content was 45.6%. The total amounts of surfactant precursor, initiator and activator used were 10.4%, 0.006% and 0.04% respectively, based on a total weight of monomer.

EXAMPLE 17

In this Example, the incorporation is shown in the latex polymer of an even higher proportion of "reactive" monomer than that of Example 16.

The procedure of Example 13 was repeated, using the following charges:

| Initial charge | |
|---|---|
| Deionised water | 200 g |
| Surfactant precursor G (see below) | 4.4 g |

Surfactant precursor G was the product of successive condensation of pentaerythritol triallyl ether with 4 mols of butylene oxide and 65 mols of ethylene oxide.

| "Seed" monomers | |
|---|---|
| Methyl methacrylate | 9.6 g |
| Butyl acrylate | 8.3 g |
| "Seed" initiator | |
| Hydrogen peroxide, 20 vols. | 0.024 g |
| Water | 1.0 g |
| Ascorbic acid | 0.01 g |
| Water | 1.0 g |
| First "feed" charge | |
| Methyl methacrylate | 25 g |
| Butyl acrylate | 43 g |
| Glycidyl methacrylate | 84 g |
| Surfactant precursor G | 14.7 g |
| First "feed" initiator | |
| Hydrogen peroxide, 20 vols. | 0.12 g |
| Water | 15.0 g |
| Ascorbic acid | 0.05 g |

-continued

| | |
|---|---|
| Water | 15.0 g |
| Second "feed" charge | |
| Methyl methacrylate | 5 g |
| Butyl acrylate | 9 g |
| Glycidyl methacrylate | 16 g |
| Surfactant precursor G | 1.75 g |
| Second "feed" initiator | |
| Hydrogen peroxide, 20 vols. | 0.04 g |
| Water | 2.0 g |
| Ascorbic acid | 0.02 g |
| Water | 2.0 g |

The latex thus obtained gave a "Nanosizer" reading of 2:124. The solids content was 48.4% and the monomer composition of the polymer was 20/30/50 methyl methacrylate/butyl acrylate/glycidyl methacrylate. The total amounts used of surfactant precursor, initiator and activator were 10.4%, 0.005% and 0.04% respectively, based on the total weight of monomer.

EXAMPLE 18

This Example shows the production of a latex polymer having a crosslinked core, through the inclusion of a polyfunctional monomer in the initial "feed" charge, together with an outer shell carrying functional groups derived from appropriate functional monomers present in the second "feed" charge.

| | |
|---|---|
| Initial charge | |
| Deionised water | 1000 g |
| Surfactant precursor F | 6 g |
| "Seed" monomers | |
| Methyl methacrylate | 9.7 g |
| Butyl acrylate | 10.5 g |
| "Seed" initiator | |
| Hydrogen peroxide, 20 vols. | 0.12 g |
| Water | 2.0 g |
| Ascorbic acid | 0.05 g |
| Water | 2.0 g |
| First "feed" charge | |
| Methyl methacrylate | 159.5 g |
| Butyl acrylate | 169.4 g |
| Allyl methacrylate | 10.8 g |
| Surfactant precursor F | 34 g |
| First "feed" initiator | |
| Hydrogen peroxide, 20 vols. | 1.2 g |
| Water | 40 g |
| Ascorbic acid | 0.5 g |
| Water | 40 g |
| Second "feed" charge | |
| Butyl acrylate | 69.8 g |
| Hydroxyethyl acrylate | 21.2 g |
| Methacrylic acid | 14.9 g |
| Surfactant precursor F | 4.5 g |
| Second "feed" initiator | |
| Hydrogen peroxide, 20 vols. | 0.24 g |
| Water | 5.0 g |
| Ascorbic acid | 0.1 g |
| Water | 5.0 g |

After removal by filtration of a small amount of coagulum, the resulting latex gave a "Nanosizer" reading of 2:111. The monomer composition of the polymer was 36/54/2/3/5 methyl methacrylate/butyl acrylate/allyl methacrylate/methacrylic acid/hydroxyethyl acrylate, and the monomer conversion was 96%. The solids content of the latex was 30.7%. The total amounts of surfactant precursor, initiator and activator used were 9.6%, 0.018% and 0.13% respectively, based on total monomer weight.

We claim:

1. A polymerisation process in which at least one ethylenically unsaturated monomer, having a solubility in water in the range 0.08%–8% by weight but giving rise to a polymer which is insoluble in water, is emulsified in water and is subjected in that state to polymerisation in the presence of (a) a redox-type polymerisation initiator system comprising hydrogen peroxide in combination with a non-ionic water-soluble activator compound, (b) 0.5% to 10%, by weight of the monomer to be polymerized, of a conventional non-ionic surfactant and (c) 0.5 to 20%, by weight of the monomer to be polymerized, of a precursor compound the molecule of which consists of (i) a polyethylene glycol chain which has a molecular weight of 500 to 4,000 and (ii) attached to said chain at least one unsaturated grouping selected from the group consisting of methacrylate and allyl.

2. A process as claimed in claim 1, wherein the monomer being polymerised is such that the resulting polymer has a glass transition temperature of not more than 60° C.

3. A process as claimed in claim 1, wherein the non-ionic water-soluble activator compound is ascorbic acid.

4. A process as claimed in claim 1, wherein the hydrogen peroxide is employed in an amount of from 0.003% to 6.0% by weight, and the activator compound in an amount of from 0.01% to 7.5% by weight, based on the amount of monomer being polymerised.

5. A process as claimed in claim 1, wherein the polyethylene glycol chain (i) has a molecular weight of at least 1000.

6. A process as claimed in claim 5, wherein the polyethylene glycol chain (i) is derived from a polyethylene glycol, or a monoalkyl ether thereof, in which the alkyl group contains from 1 to 4 carbon atoms.

7. A process as claimed in claim 6 wherein the polyethylene glycol chain (i) is derived from a polyethylene glycol, or a monomethyl ether thereof, of molecular weight in the range 2000–4000.

8. A process as claimed in claim 7, wherein the precursor compound is the methacrylic acid ester of the monomethyl ether of polyethylene glycol, mol.wt. 2000.

9. A process as claimed in claim 1, wherein there is present, in an amount of from 0.1% to 2% by weight of the monomer taken, a water-soluble chain transfer agent.

10. A process as claimed in claim 1, wherein the monomers to be polymerised include a reactive monomer selected from glycidyl acrylate, glycidyl methacrylate and γ-methacryloxypropyltrimethoxysilane.

11. A sterically stabilised aqueous dispersion of polymer obtained by a process as claimed in claim 1.

12. A sterically stabilised aqueous dispersion of polymer obtained by a process as claimed in claim 1.

* * * * *